(12) United States Patent
Bailey et al.

(10) Patent No.: US 10,396,565 B2
(45) Date of Patent: Aug. 27, 2019

(54) SYSTEM AND METHOD FOR POWER DISTRIBUTION

(71) Applicant: GE Aviation Systems Limited, Cheltenham (GB)

(72) Inventors: Michael David Bailey, Tewkesbury (GB); Colin John Halsey, Tewkesbury (GB); Ross Jonathan Williams, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 0 days.

(21) Appl. No.: 15/569,797

(22) PCT Filed: May 6, 2015

(86) PCT No.: PCT/IB2015/001454
§ 371 (c)(1),
(2) Date: Oct. 27, 2017

(87) PCT Pub. No.: WO2016/178054
PCT Pub. Date: Nov. 10, 2016

(65) Prior Publication Data
US 2018/0138716 A1    May 17, 2018

(51) Int. Cl.
*H02J 4/00*  (2006.01)
*H02J 3/14*  (2006.01)
(Continued)

(52) U.S. Cl.
CPC .............. *H02J 4/00* (2013.01); *B64D 47/00* (2013.01); *H02J 3/14* (2013.01); *H02J 13/00* (2013.01);
(Continued)

(58) Field of Classification Search
CPC ... H02J 3/14; H02J 13/00; H02J 3/003; B64D 2221/00
See application file for complete search history.

(56) References Cited

U.S. PATENT DOCUMENTS

2012/0089265 A1*  4/2012  Kucinskas ............... H02J 3/14
                                                  700/293

FOREIGN PATENT DOCUMENTS

EP    2151033        2/2010
EP    2216246 A2     8/2010
(Continued)

OTHER PUBLICATIONS

PCT International Search Report issued in connection with corresponding PCT Application No. PCT/IB2015/001454 dated Jan. 15, 2016.

*Primary Examiner* — Robert L Deberadinis
(74) *Attorney, Agent, or Firm* — McGarry Bair PC

(57) ABSTRACT

A system for aircraft power distribution (100) includes a source of energy (112) to deliver an input power; a bus contactor (122); a set of switches (130) connected between the bus contactor and a set of essential and non-essential devices (132); a current analysis component (315) to determine a power level drawn from the source of current by the set of essential and non-essential devices (132); a variation reduction component (317) to determine an energization schedule of the set of essential and non-essential devices (132) based on reducing temporal variation in the input power drawn from the source of energy (112) to the bus contactor (122); and a switch control component (319) configured to adjust the set of switches (130) according to the energization schedule. If too much power is drawn, the set of switches (130) will be configured such as not to exceed the maximum power rating of the source (112).

20 Claims, 7 Drawing Sheets

(51) Int. Cl.
    *H02J 13/00*     (2006.01)
    *B64D 47/00*     (2006.01)
    *H02J 3/28*     (2006.01)
    *H02J 3/00*     (2006.01)
    *B64D 11/04*     (2006.01)
    *B64D 15/12*     (2006.01)

(52) U.S. Cl.
    CPC .............. *B64D 11/04* (2013.01); *B64D 15/12* (2013.01); *B64D 2221/00* (2013.01); *H02J 3/28* (2013.01); *H02J 2003/003* (2013.01)

(56) References Cited

FOREIGN PATENT DOCUMENTS

| | | | |
|---|---|---|---|
| EP | 2838173 | A1 | 2/2015 |
| WO | 2010047902 | A2 | 4/2010 |

\* cited by examiner

SYSTEM AND METHOD FOR POWER DISTRIBUTION

BACKGROUND OF THE INVENTION

Power distribution systems manage the allocation of power from energy sources to electrical loads that consume distributed electrical power. In aircraft, gas turbine engines for propulsion of the aircraft typically provide mechanical energy that ultimately powers a number of different accessories such as generators, starter/generators, permanent magnet alternators (PMA), fuel pumps, and hydraulic pumps, e.g., equipment for functions needed on an aircraft other than propulsion. For example, contemporary aircraft need electrical power for electrical loads related to avionics, motors, and other electric equipment. A generator coupled with a gas turbine engine will convert the mechanical energy generated by the engine into the electrical energy needed to power accessories.

BRIEF DESCRIPTION OF THE INVENTION

In one aspect, a system for aircraft power distribution includes a source of current to deliver an input power; a bus contactor connected to the source of current to receive the input power; a set of switches connected between the bus contactor and a set of essential and non-essential devices; a current analysis component to determine a power level drawn from the source of current by the set of essential and non-essential devices; a variation reduction component to determine an energization schedule of the set of essential and non-essential devices based on reducing temporal variation in the input power drawn from the source of current to the bus contactor; and a switch control component configured to adjust the set of switches according to the energization schedule.

In another aspect, a method of distributing power in an aircraft includes receiving a signal representing current flow from a source of current to a set of essential and non-essential devices; determining current draw by the set of essential and non-essential devices based on the signal; determining an energization schedule of the set of essential and non-essential devices; and adjusting a set of switches between a bus contactor and the set of essential and non-essential devices based on the energization schedule to reduce variation in the current draw from the source of current.

In another aspect, a power distribution controller for an aircraft includes a current analysis component to determine a power level drawn from a source of current by a set of essential and non-essential devices; a variation reduction component to determine an energization schedule of the set of essential and non-essential devices to reduce variation in the input power drawn from the source of current to a bus contactor; and a switch control component configured to adjust a set of switches that couple the set of essential and non-essential devices to the source of current according to the energization schedule.

DESCRIPTION OF EMBODIMENTS OF THE INVENTION

Figure 1:
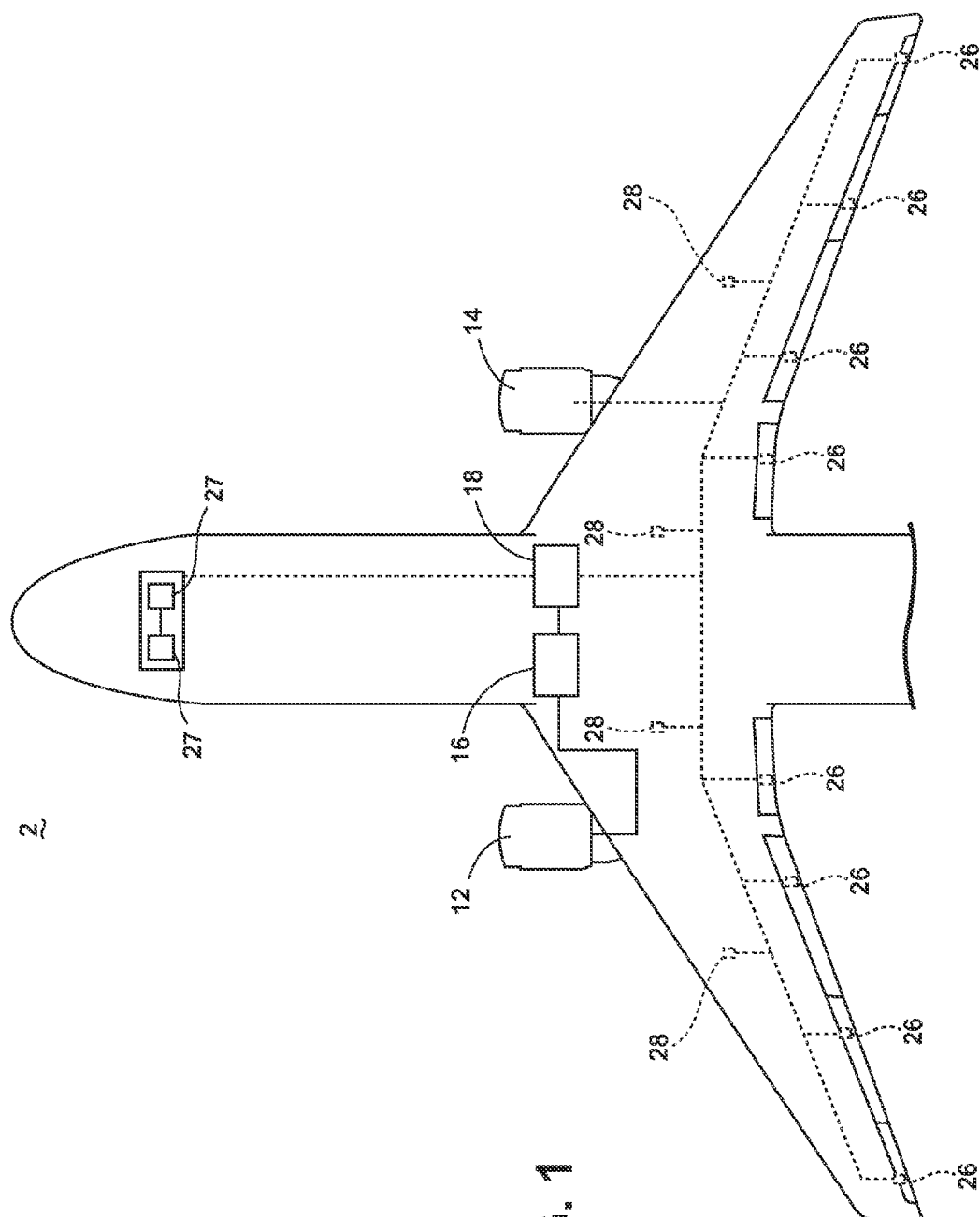
FIG. 1 is a top down schematic view of an aircraft and power distribution system.

It will be understood that details of environments that can implement embodiments of the invention are set forth in order to provide a thorough understanding of the technology described herein. It will be evident to one skilled in the art, however, that the exemplary embodiments can be practiced without these specific details. The drawings illustrate certain details of specific embodiments that implement a module or method, or computer program product described herein. However, the drawings should not be construed as imposing any limitations that can be present in the drawings. The method and computer program product can be provided on any machine-readable media for accomplishing their operations. The embodiments can be implemented using an existing computer processor, or by a special purpose computer processor incorporated for this or another purpose, or by a hardwired system.

As noted above, embodiments described herein can include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general-purpose computer, special purpose computer, or special purpose processing machines to perform a certain function or group of functions.

Embodiments will be described in the general context of method steps that can be implemented in one embodiment by a program product including machine-executable instructions, such as program codes, for example, in the form of program modules executed by machines in networked environments. Generally, program modules include routines, programs, objects, components, data structures, etc., that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

The embodiments of the present invention are described herein in the context of an aircraft, which enables production of electrical power from an energy source such as a turbine engine, jet fuel, hydrogen, etc. However, it will be understood that while one embodiment of the invention is shown in an aircraft environment, the invention is not so limited and has general application to electrical power systems in non-aircraft applications, such as other mobile applications and non-mobile industrial, commercial, and residential applications. For example, applicable mobile environments can include an aircraft, spacecraft, space-launch vehicle, satellite, locomotive, automobile, etc. Commercial environments can include manufacturing facilities or power generation facilities.

As shown in FIG. 1, an aircraft 2 is shown having at least one gas turbine engine, shown here as a left engine system 12 and a right engine system 14 which can be substantially identical to each other. The aircraft 2 can have any number of engine systems. In the embodiment of FIG. 1 the left engine system 12 can be coupled to one or more electrical power sources 16 that convert mechanical energy into electrical power. Other power sources, such as batteries and fuel cells, can convert chemical energy into electrical power. It will be understood that any or all of the engines in an aircraft 2, including the left and right engine systems 12, 14 can be so coupled to one or more electrical power sources 16. The electrical power source 16 can be coupled to a power distribution system 18 that selectively energizes a set of essential and non-essential devices.

Devices can be classified according to impacts that a failure of the devices or loss of the device's intended functions would have on the overall safety of the aircraft. Essential devices are those whose failure would contribute to or cause a failure condition which would significantly impact the safety of the airplane or the ability of the flight crew to cope with adverse operating conditions. Example essential devices can include, but are not limited to devices that provide loads needed for full operation range of an aircraft, such as, de-icing, full function flight management, secondary flight control functions, specific lighting for users and air management, etc. Critical devices, a subset of essential devices, are those whose failure would contribute to or cause a failure condition which would prevent the continued safe flight and landing of the aircraft. Example critical devices can include, but are not limited to devices that provide fire detection and suppression loads, loads needed to fly to a nearest airport and land, such as, primary flight control, limited instrument set, pressurization control, fuel pumps, landing gear deploy, emergency signs etc. Non-essential devices are those whose failure would not contribute to or cause a failure condition which would significantly impact the safety of the aircraft or the ability of the flight crew to cope with adverse operating conditions. Example non-essential devices can include, but are not limited to devices that provide consumer loads such as seat power for laptops, galley power for cooking or coffee, background illuminations and signs, etc. See Advisory Circular 25.1309-1 entitled "System Design Analysis" published by the US Federal Aviation Administration on Sep. 7, 1982 for additional reference.

Note that essential devices can power one or more essential or flight critical (i.e. emergency) loads. Essential loads are powered from multiple sources whereas emergency loads are powered from an independent emergency power source and distribution. As presented herein, the power distribution system can apply, without limitation, to provide electrical power to devices that provide essential loads, flight critical loads or a combination thereof. For instance, the essential and non-essential devices can include the components that draw output power for flight critical loads 27, and non-flight critical loads 28. For example, an actuator load 26 can be an essential device that includes a flight critical load. The electrical loads 26, 27, 28 are electrically coupled with the electrical power source 16 such that the loads 26, 27, 28 are configured to draw an output power load from the electrical power source 16.

In the aircraft 2, the operating left and right engine systems 12, 14 provide mechanical energy that can be extracted via a spool, to provide driving force for the electrical power source 16. The electrical power source 16, in turn, provides the generated power to the electrical loads 26, 27, 28 for load operations.

Figure 2:
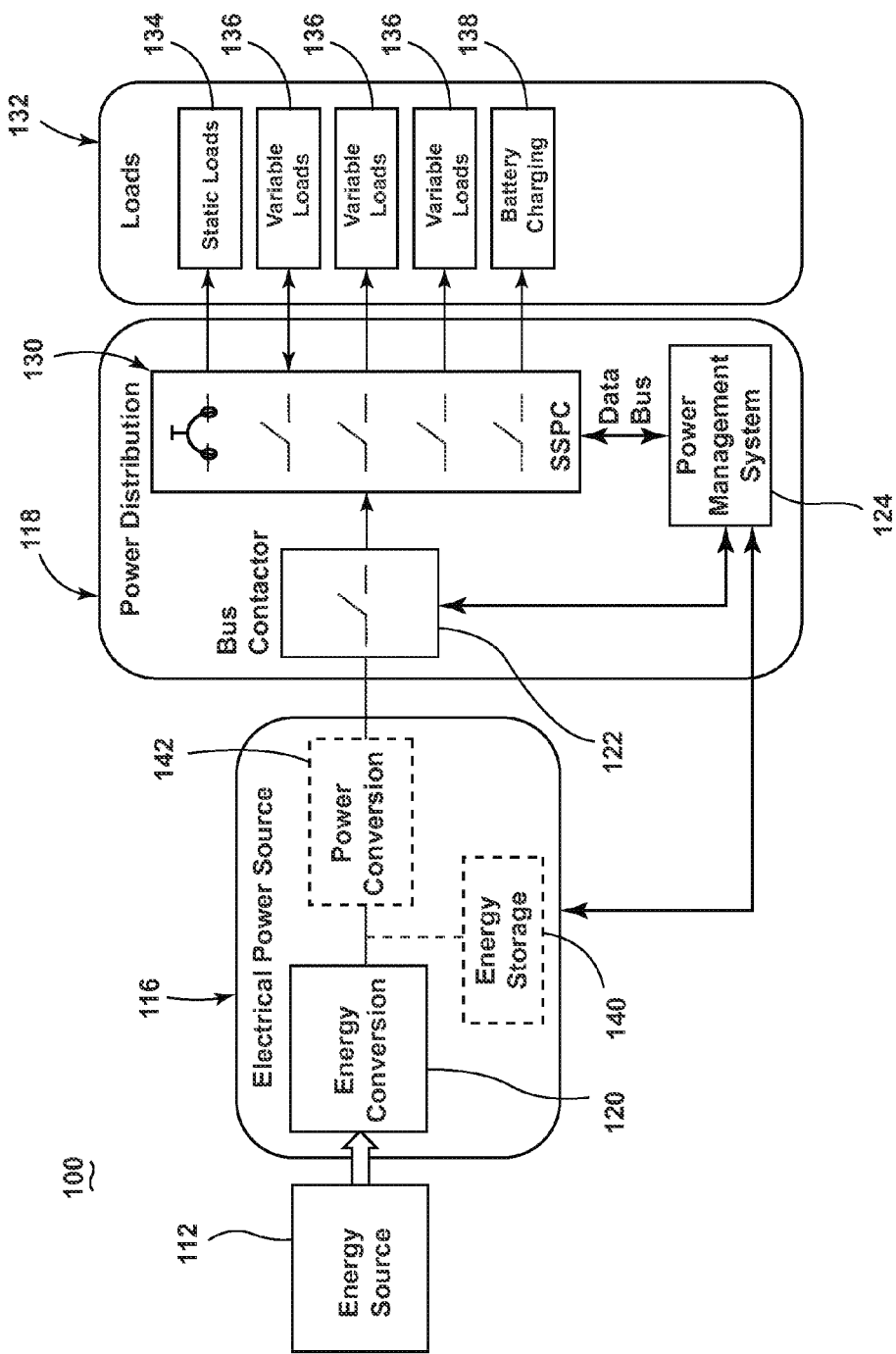
FIG. 2 illustrates a schematic block diagram of a power distribution system for an aircraft.

FIG. 2 illustrates a schematic block diagram of an exemplary power distribution system 100 for an aircraft, of the type shown in FIG. 1. An electrical power source 116, coupled to an energy source 112, converts energy into a source of current to deliver an input power to an electrical power distribution system 118. The current can be alternating current or direct current depending upon the implementation.

In the electrical power distribution system 118, a bus contactor 122, receives the generated input power from the electrical power source 116. The electrical power distribution system 118 includes the bus contactor 122, a set of switches 130 and a power management system (hereinafter referred to as "controller") 124 connected to the bus contactor 122 and the set of switches 130. The switches 130 selectively couple the bus contactor 122 and a set of essential and non-essential devices 132, each configured to draw an output power load. The controller 124 is configured to adjust selected switches on or off to reduce variation in the input power from the electrical power source 116 to the bus contactor 122.

As described above, the energy source 112 for an aircraft can include the mechanical rotor of a gas turbine engine. However, the energy source 112 is not limited to a gas turbine engine or even to a source of mechanical energy. For example, the energy source can be a source of chemical energy of which non-limiting examples include jet fuel and hydrogen. The energy source 112 is preferably a source of energy applicable to an aircraft environment and specifically amenable to conversion to electrical energy. In this way, the energy source 112 can be selected, in part, based on the electrical power source 116 of the power distribution system 100.

The electrical power source 116 includes at least one energy conversion element 120. The energy conversion element 120 converts the supplied energy from the input energy source 112 to electrical power. Example energy conversion elements in an aircraft environment include a fuel cell system, a generator, etc.

Depending upon the implementation, the electrical power source 116 can also include an energy storage element 140, a power conversion element 142 or both. The energy storage element 140 can store excess electrical energy output from the energy conversion element 120 generated when the electrical power source 116 generates more electrical power than required by the loading requirements of the set of essential and non-essential devices 132. Non-limiting examples of energy storage elements include batteries and capacitors. For example, the energy storage element can include super capacitors for mitigating short-term transients in power requirements if a battery is not suitable.

An electrical power conversion element 142 converts electrical power from one form to another. That is, the electrical power conversion element 142 transforms the properties of electrical power such as voltage, current and frequency from the input to the output. Non-limiting examples of an electrical power conversion element include a buck convertor which steps down voltage and steps up current, a boost converter which steps up direct current voltage and an inverter that transforms electrical power from direct current to alternating current.

As an example of an electrical power source 116, consider a fuel cell system, comprising a fuel cell, air supply, cooling plant and power converter that preferably operates at a constant power draw. That is, it takes time for a hydrogen fuel cell to changes its output power, hence for short periods, a hydrogen fuel cell is a constant power source such that any increase or decrease in current will cause the fuel cell's voltage to lower or increase to maintain the output power level. Therefore, when the loading is dynamic, a fuel cell typically requires an output boost power conversion element 142 to maintain the output voltage within an acceptable range. Advantageously, if the output of the fuel cell power system was maintained at a constant power level, then the power conversion element 142 could be removed, thereby reducing the weight of the overall system.

The bus contactor 122 is connected to the electrical power source 116 to receive the power output from the electrical power source 116. The bus contactor 122 enables power flow to the set of switches 130. The bus contactor 122 can output a signal representative of a measured current through the bus contactor 122. It is contemplated that the bus contactor 122 can control power flow to the set of switches 130 with conventional internal switching relays though the bus contactor can be implemented as a solid-state power controller (SSPC) to provide enhanced flexibility for control.

The set of switches 130 connected to the bus contactor 122 distributes power and provides protection to the set of essential and non-essential devices 132. While the set of switches 130 can be implemented as an array of electromechanical switches, the set of switches preferably includes a solid-state power controller. In comparison to electromechanical switching devices, solid-state power controllers provide fast response time, eliminate arcing during turn-off transients and bouncing during turn-on transients and do not suffer severe degradation during repeated fault isolation. Solid-state power controllers can regulate power output at the set of switches by pulse width modulation.

Solid-state power controllers inherently sense and monitor the load current on the switches and have the capability to control output current. Power distribution systems with solid-state power controllers facilitate efficient power distribution, in part, by including real-time feedback concerning loading and current levels. As shown in FIG. 2, the solid-state power controller can provide the feedback information to the controller 124 over a data bus.

Additionally, the bus contactor 122 and the electrical power source 116 can sense and monitor an output current. The controller 124 can use the current measurements provided by the set of switches 130, the bus contactor 122, the electrical power source 116 or any combination of those elements, along with any additional load characteristic database to determine the overall power demand. Using the feedback information, the controller 124 monitors the total load demand of the output power load drawn by the essential and non-essential devices 132. The controller 124 allows the power source 116 to operate at peak efficiency by matching the load to a region of operation of the power source 116 that corresponds to the source's peak efficiency. The controller 124 can operate in an open loop configuration. The controller 124 can operate software to execute an algorithm or access a lookup table or a combination of both that prioritizes the loads of the essential and non-essential devices 132 and selects a load combination that matches the power level of the electrical power source 116 when operated at peak efficiency.

A current analysis component of the controller 124 determines the overall power demand of the set of essential and non-essential devices 132 by determining the combination of static loads 134, variable loads 136. That is, the set of essential and non-essential devices 132 can include static loads 134 that, when energized, consume a fixed amount of power and variable loads 136 that, when energized, consume an adjustable amount of power. The current analysis component controller 124 compares the determined overall power demand of the set of essential and non-essential devices to the nominal full load rating of the electrical power source 116 and a variation reduction component and a switch control component of the controller 124 adjust the activation of the set of switches 130 so that a constant load from the set of essential and non-essential devices 132 can be presented to the electrical power source 116. For example, when the load demand is low, variable loads 136 of the set of essential and non-essential devices 132 such as presented by windshield heaters, galley ovens, etc., or a battery charging load 138 can be used as energy sinks. That is, the controller 124 can selectively energize a subset of the electrical loads of the set of essential and non-essential devices 132 to maintain constant output power load drawn from the electrical power source 116. The controller 124 can selectively enable additional energy storage devices 140 to meet transient power overload requirements. Conversely, when the power demand on the electrical power source 116 is high, the controller 124 can shed some loads; that is, de-energize or limit the power draw from non-essential devices without having any detrimental effect on the aircraft operation. The controller 124 can switch on loads such as wing de-icing that can be switched on and off as necessary to act as a ballast. In this way, the power management system reduces variation in the input power level from the electrical power source 116 to the bus contactor 122. That is to say, the controller 124 leverages the available loads of the non-essential devices to maintain a constant power level demand.

The controller 124 can activate the energy storage devices 140 that have been charged during times of surplus power generation. In this way, the energy storage devices 140 supply additional electrical power to the electrical power distribution system 118 when the load demand from the essential and non-essential devices 132 is above the power level output from the energy conversion device 120. Additionally, the controller 124 can activate the energy storage devices 140 to smooth out any delay or lag in matching the power level output from the electrical power source 116 to the output power loads of the essential and non-essential devices 132.

The controller 124 controls the bus contactor 122, the power conversion element 142 (if implemented) and the loading levels of the essential and non-essential devices 132, so that a constant power is drawn from the electrical power source 116. That is, the controller 124 controls the output loads of the essential and non-essential devices 132 and the energy storage devices 140 to present an electrical generation system with a nominally constant load.

Many electrical sources and converters have their performance compromised by load variations. In many applications, the electrical source is oversized to meet peak demands even though the excursions above the norm can be of a short duration. When a system is designed to meet the load demand in a point-to-point system (i.e. the loads are individually controlled without considering the overall energy demand of the system), the power source, converters and electrical wiring are sized to meet the maximum peak power demand. However, the controller 124 considers the overall energy demand and controls select individual loads to maintain a constant power draw on the electrical power source. Electrical power sources, such as a fuel cell system (including coolant pumps, radiator cooling fans, air supply, etc.), operate more effectively at constant power and experience a precipitous drop in efficiency when mitigating variations in output power.

As an example of the power distribution system and power management system function, consider the electrical loading characteristics of a system such as an aircraft flight control system. The aircraft flight control system incurs brief, but high peak power loading demands. Instead of increasing the capacity of an on-board generator to meet the peak demands, the power management system can draw power from energy storage devices that can provide the necessary bursts of power for the aircraft flight control system. Nearly all aircraft carry batteries that add substantial weight to the aircraft but are typically only used for engine start or to aid no break power transfers. The power management system can use the batteries more effectively to fulfill short occurrences of increased energy demand and then re-charge the batteries during low energy demand cycles. For longer periods, the power management system can temporarily throttle back using pulse width modulation high power loads such as galley ovens. Alternatively, during periods of excess available power, the power management system can initiate energy storage for later use.

In the case where the electrical power source is used for emergency power, the electrical power source 116 and energy source 112 are sized to meet peak demands. During an emergency power scenario, using up the fuel source is less of a concern provided there is sufficient power available to meet the peak requirements (e.g. 5 kW for 10 seconds). Hence, the controller 124 can dissipate power in loads via either a resistive load dump or a ballast load such as provided by a windshield heater, etc., to maintain a constant power draw and reduce the variation in the power draw requirements.

Figure 3:
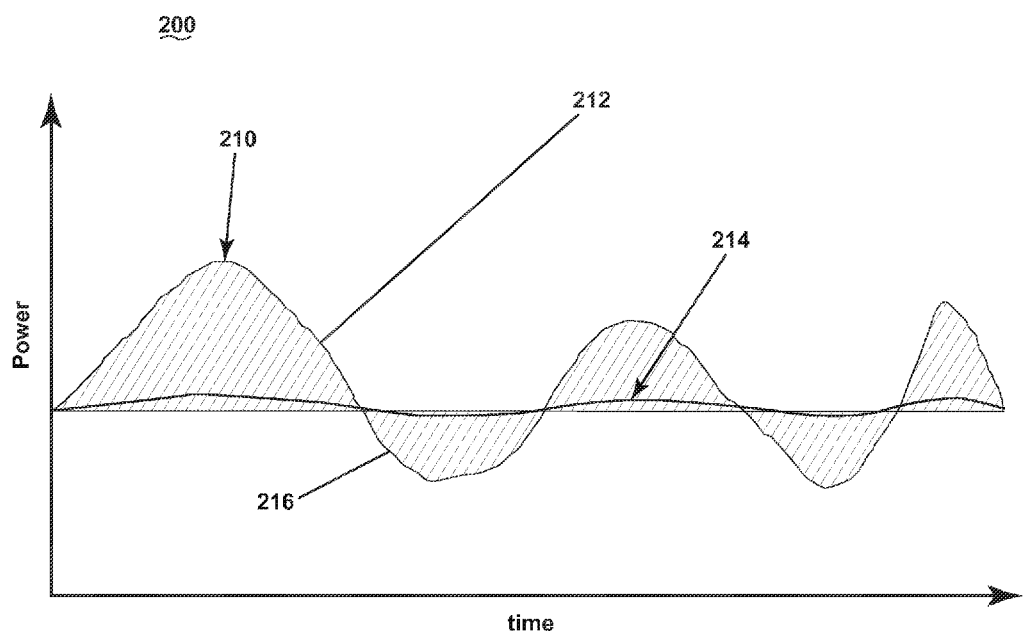
FIG. 3 illustrates power versus time for the electrical power source and the reduction in variation in the power draw using the power distribution system according to an embodiment of the invention.

FIG. 3 illustrates a plot 200 of power versus time for the electrical power source and the reduction in variation in the power draw using the power management system according to an embodiment of the invention. The power management system receives information related to power load draw as described above. Initially the power management system infers the power draw according to the hatched curve 210 by monitoring and analyzing the current draw of the power sources and the power sinks (i.e. the loads of the essential and non-essential devices) as described below. That is, the power management system determines that the electrical power source will experience an increased power demand as shown by the hatched curve at 216. Therefore, prior to the power demand (as shown at 212), the power management system can engage certain non-essential devices to shed loads and can store energy in batteries or capacitors. Consequently, the electrical power source outputs a lower excess power as shown in the curve 214. During the peak demand at 216, the power management system can engage various load sinks as described above, with the result of limiting the variation in power drawn from the source (again, as shown by curve 214).

The overall result is that the total power drawn is the same for both the hatched curve 210 where the power management system is not implemented and the curve 214 where the power management system is used. That is, the integrals of the two curves are substantially the same. However, the power management system has minimized the peak-to-peak variation in the power output from the electrical power source.

Figure 4:
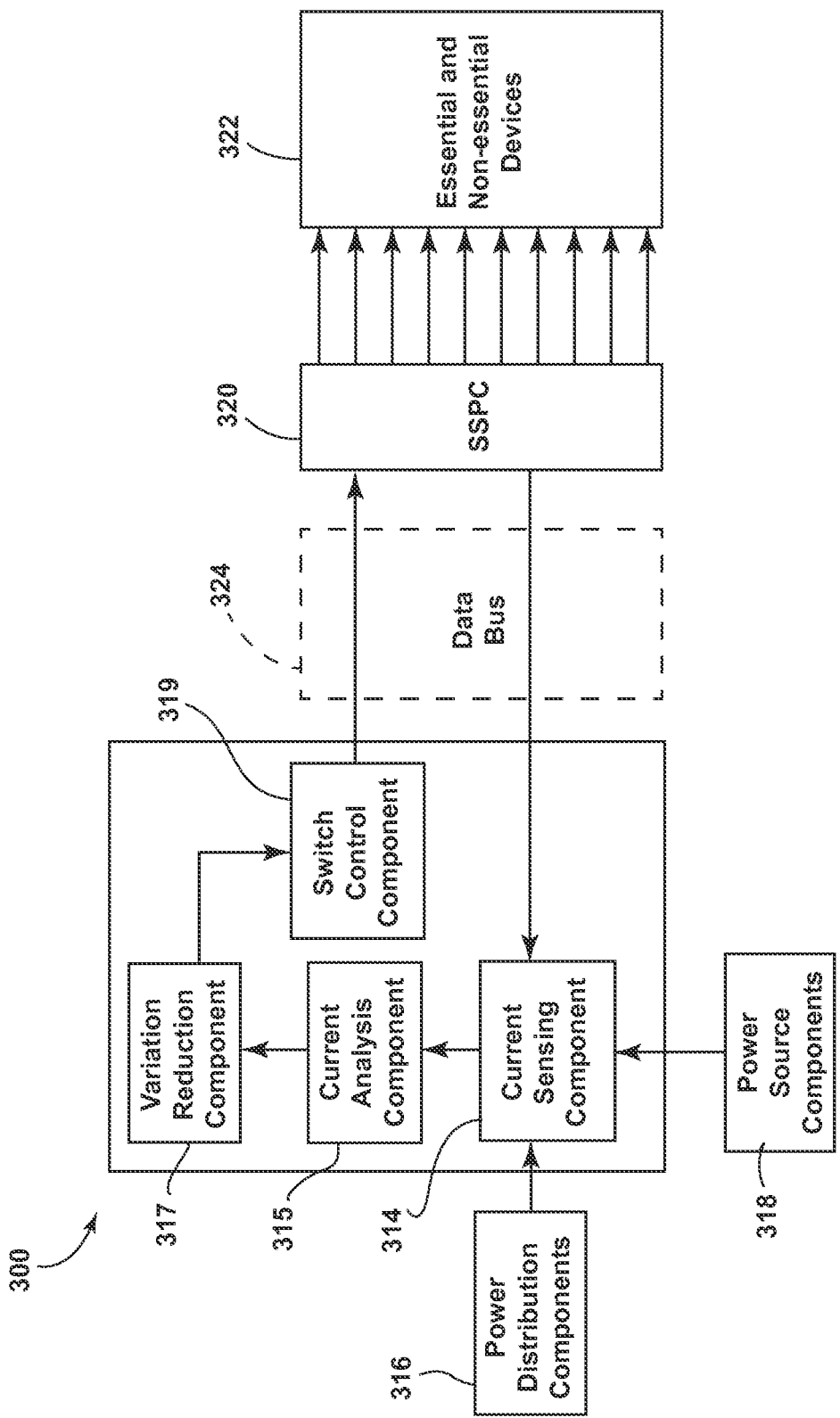
FIG. 4 illustrates a schematic block diagram of a controller for a power distribution system according to an embodiment of the invention.

Referring now to FIG. 4, a schematic block diagram of a controller 300 for a power distribution system according to an embodiment is shown. The controller 300 manages the distribution of power to a set of essential and non-essential devices 322 that are each configured to draw an output power load through the set of switches 320 (diagrammatically represented with a non-limiting example of a solid-state power controller or SSPC). The controller 300 can be communicatively coupled to the set of switches 320 by a data bus 320. The data bus 320 can be any suitable bus for transferring data between electronic components, including, but not limited to, Peripheral Component Interconnect Express, officially abbreviated as PCIe.

The controller 300 includes a one or more current sensing components 314, a current analysis component 315, a variation reduction component 317 and a switch control component. The controller 300, by way of the current sensing components 314, can be coupled to the power source components 318 that provide the source of current to deliver input power to the power distribution system. The power source components 318 can include any suitable power source components including, but not limited to, a fuel cell, a battery, a capacitor, a generator and a convertor. The controller 300, by way of the current sensing components 314, can be coupled to the power distribution components 316 that couple the input power to the essential and non-essential devices 322. The power distribution components 316 can include any suitable power distribution components including, but not limited to, a bus contactor. Recall that the bus contactor is connected to the source of current to receive the input power into the power distribution system.

In an embodiment the controller 300, via the current sensing component 314 receives signals corresponding to, characterizing or otherwise representing, current flow through the power distribution components 316 or the power source components 318. The current sensing components 314 can include any electronic elements and devices known for measuring current flow including but not limited to a current sensing comparator, a current sensing amplifier, a current sensing transducer or combinations thereof. The current sensing components 314 can include one or more digital bus lines for receiving data representing current flow that can be measured remote from the controller 300. For example, the current flow for the set of switches 320 can transmit as digital data to the current sensing component 314 by way of data bus 324.

The current analysis component 315 determines the current draw from the power source components 318 in comparison to the loading requirements from the set of essential and non-essential devices 322. The current analysis component 315 can compare energy resources available from the power source components 318 and energy demands from the set of essential and non-essential devices 322. The current analysis component 315 can access data related to the prioritization of the loads from the set of essential and non-essential devices 322. The current analysis component 315 acts as a ledger to tally the available power and the near-term loading requirements. The current analysis component 315 can include any suitable combination of software and hardware for analyzing the current draw requirements of the power distribution system including, but not limited to, application-specific integrated circuit, flash memory, random access memory, field-programmable gate array and combinations thereof including bespoke and industry standard software configured on said devices for performing the current analysis.

The variation reduction component 317 determines an energization schedule for the set of essential and non-essential devices 322 based on the current analysis and the loading requirements and priorities of the set of essential and non-essential devices 322 that reduces the temporal variation of the current drawn from the power source components 318. The energization schedule is the determined timing sequence for energizing and de-energizing the loads of the set of essential and non-essential devices 322. The variation reduction component 317 compares the power output properties of the power source components 318 with the loading requirements of the set of essential and non-essential devices 322 provided by the current analysis component 315. The variation reduction component 317 reduces the temporal variation in the current draw from the power source components 318 by determining an energization schedule that sinks extra power into non-essential devices that can be turned on or have increased draw or puts off energizing non-essential devices until power is available from the power source components 318. The variation reduction component 317 can use any control algorithm that determines a reduced temporal variation in the current drawn from the power source components 318. For example, the variation reduction component 317 may have a control loop feedback mechanism that calculates an error value as the difference between a measured current flow and a desired setpoint and attempts to minimize the error as described by a proportional-integral-derivative controller. In another example, the variation reduction component 317 can include a statistical estimator such as a minimum variance estimator for determining an optimal set of loading for the set of essential and non-essential devices 322. In this example, a power source such as a hydrogen fuel cell can have operable characteristics including a mean current draw along with an acceptable variance. The variation reduction component 317 can use the minimum variance estimator to determine the energization schedule that minimizes the variance of the current drawn from the fuel cell. The variation reduction component 317 reduces the variance in the temporal current draw to increase the stability and efficiency of the power source of the power distribution system. The variation reduction component 317 can include any suitable combination of software and hardware for reducing the temporal variation of the current draw of the power distribution system including, but not limited to, application-specific integrated circuit, flash memory, random access memory, field-programmable gate array and combinations thereof including bespoke and industry standard software configured on said devices for determining acceptable current draw temporal variation for the power source components and mitigating the loading of the set of essential and non-essential devices 322.

The switch control component 319 instantiates the energization schedule by adjusting a subset of the set of switches 320 between the bus contactor and the set of essential and non-essential devices 322. The switch control component 319 can adjust a subset of the set of switches 320 by any suitable power modulation techniques, including, but not limited to pulse-width modulation (PWM). That is, the switch control component 319 can command a switch of the set of switches 320 to the open position, the close position or in the case of a pulse-width modulation scenario, a combination of close and open to institute a duty-cycle that controls the loading of the device connected to the switch. The switch control component 319 can include any suitable combination of software and hardware for controlling the set of switches 320 of the power distribution system including, but not limited to, application-specific integrated circuit, relays, switches, flash memory, random access memory, field-programmable gate array and combinations thereof including bespoke and industry standard software configured on said devices for implementing pulse-width modulation strategies for the loading of the set of essential and non-essential devices 322.

Figure 5:
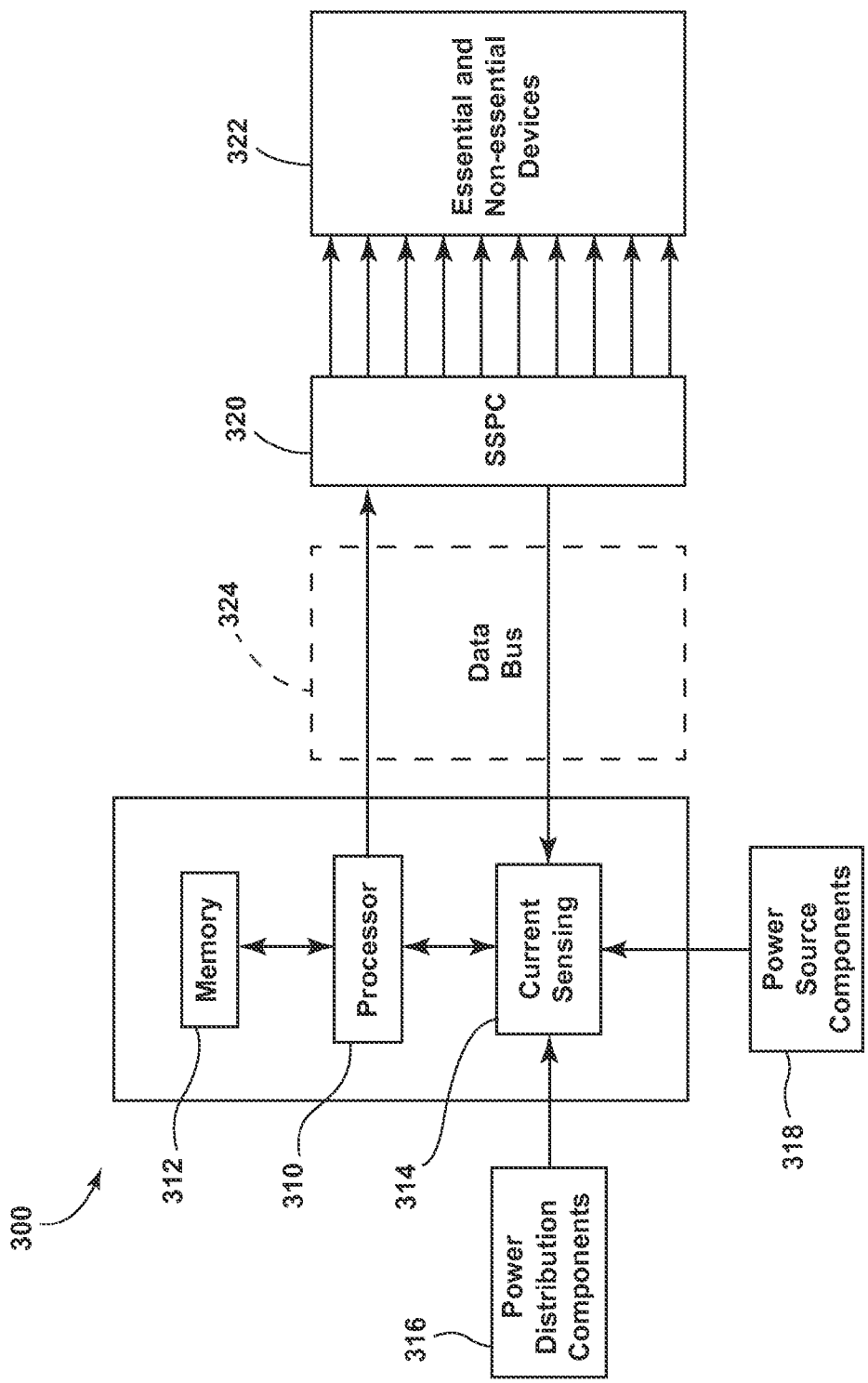
FIG. 5 illustrates a schematic block diagram of a controller for a power distribution system according to another embodiment of the invention.

Referring now to FIG. 5, a schematic block diagram of a controller 300 for a power distribution system according to another embodiment is shown. The controller 300 includes a memory 312, a processor 310 and one or more current sensing components 314. The memory 312 can include, but is not limited to, storage of a set of instructions to be executed by the processor 310. The processor and memory form the above-described current analysis component 315, the variation reduction component 317 and the switch control component 319. As such, the memory 312 and the processor 310 can include any suitable combination of software and hardware controlling the power distribution system including, but not limited to, application-specific integrated circuit, relays, switches, flash memory, random access memory, field-programmable gate array and combinations thereof including bespoke and industry standard software.

Figure 6:
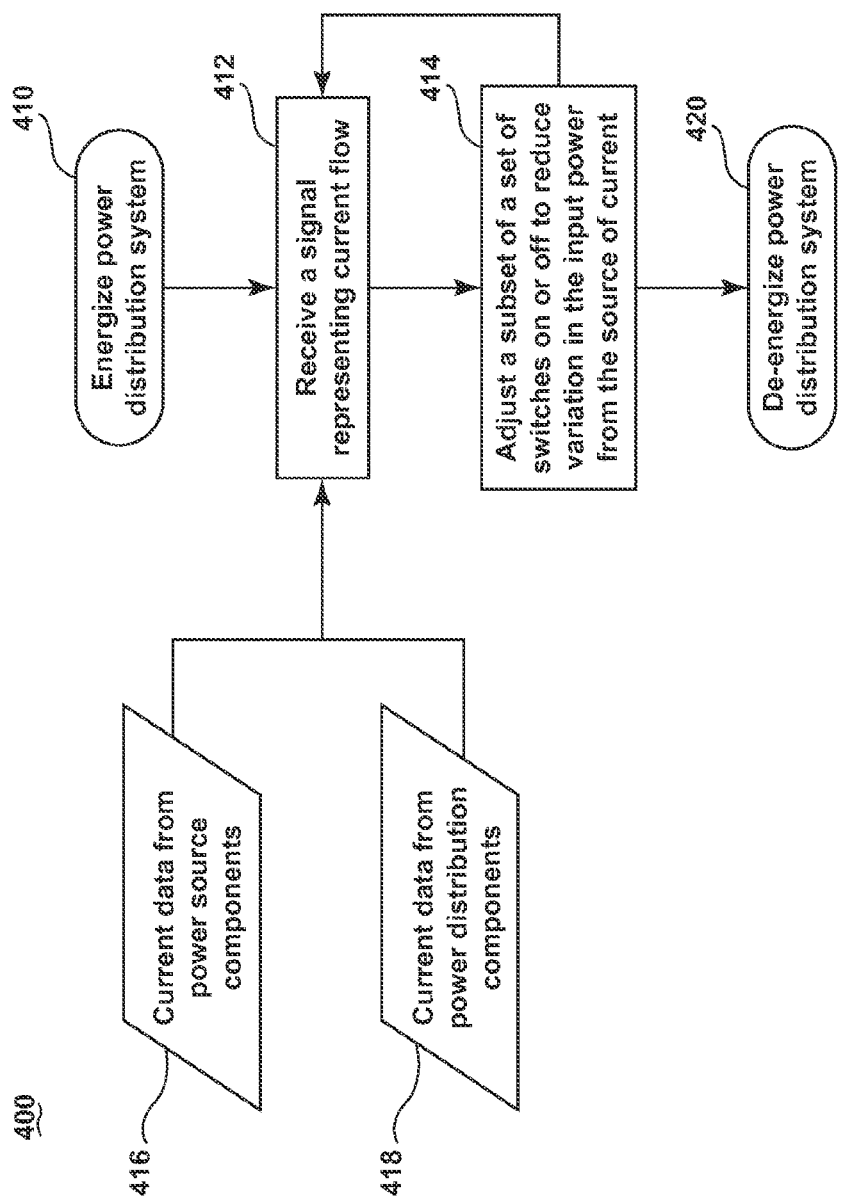
FIG. 6 is a flow chart illustrating a method of distributing power on an aircraft according to an embodiment of the invention.

Referring now to FIG. 6, a flow chart illustrating a method 400 of distributing power on an aircraft according to an embodiment is shown. Initially, at step 410, the power distribution system is energized. At step 412, the current sensing component of a controlling component of the power distribution system receives current flow data from power source components 416, current flow data from power distribution components 418 or current flow data from both power source and power distribution components. The current analysis component processes the data to compare the available input power from the power source to the prioritized power requirements of the set of essential and non-essential devices. At step 414, the switch control component adjusts a subset of a set of switches in the power distribution system on or off to reduce variation, as determined by the variation reduction component, in the input power from the source of current. The steps 412 and 414 of the receiving current flow data from power source and power distribution components and adjusting the subset of the set of switches to reduce variation in the input power from the source of current repeats until the power distribution system is de-energize at step 420. In this way, the power distribution system manages the power draw from a set of loads of essential and non-essential devices to reduce the temporal variation in the input power drawn from the source of current.

Figure 7:
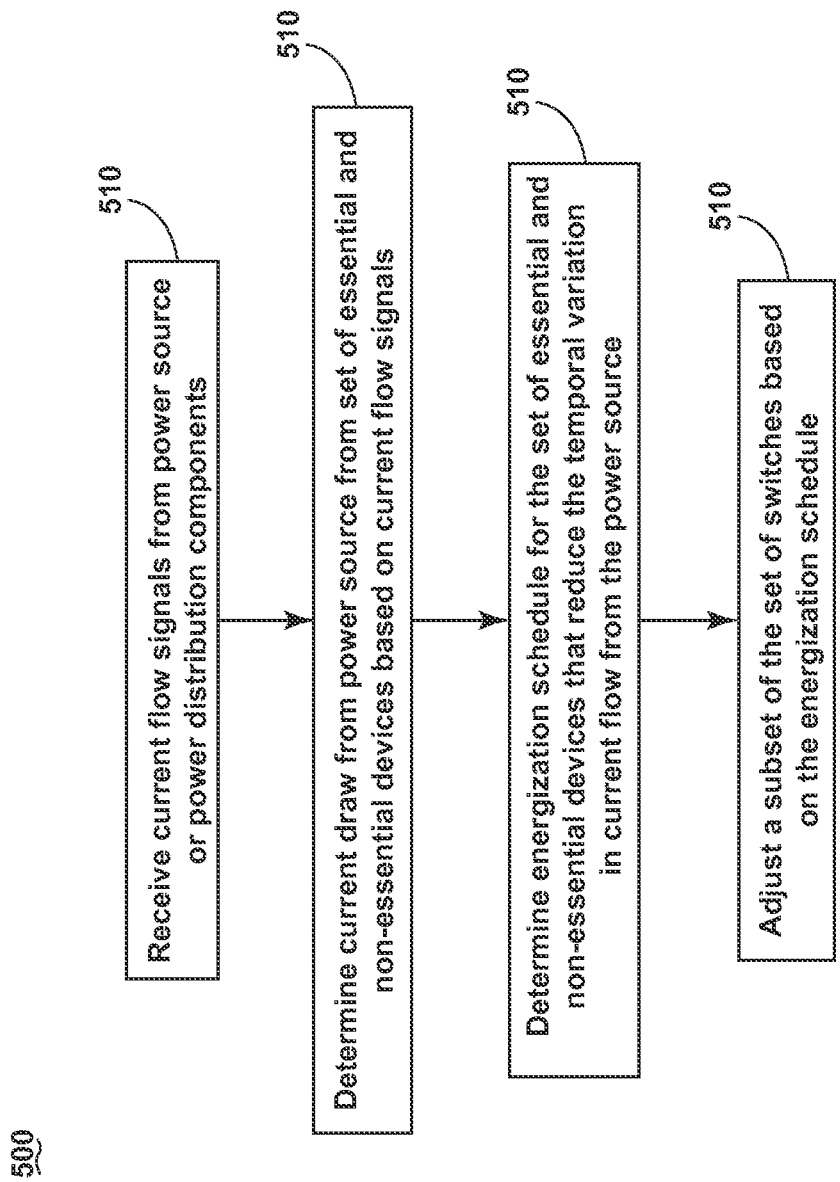
FIG. 7 is a flow chart illustrating a method of distributing power on an aircraft according to another embodiment of the invention.

Referring now to FIG. 7, a flow chart illustrating a method 500 of distributing power on an aircraft according to an embodiment is shown from the perspective of a controller. At step 510, the controller via the current sensing component, receives current flow signals from the power source or power distribution components or combinations thereof. At step 512, the controller, via the current analysis component, determines the current draw from the power source to the set of essential and non-essential devices. At step 514, the variation reduction component determines the energization schedule for the set of essential and non-essential devices that reduces the temporal variation in current draw from the power source. At step 515, the controller, via the switch control component, adjusts a subset of the set of switches based on the determined energization schedule to deliver current to a subset of the set of essential and non-essential devices.

Technical effects of the above-described embodiments include maximizing the operational time where an energy conversion device such as fuel cell or generator operates at peak efficiency. Additionally, by enforcing a constant load via the power management system, a constant output voltage from an energy conversion device enables any power conversion element to be sized lighter and more compact than in a conventional power distribution system. Increasing the overall efficiency of the power distribution system reduces fuel burn and increases the life of the system components.

Where a fuel cell is used, it may not be necessary to include a power conversion element if the fuel cell can directly power the loads. Optimizing the performance and weight of an electrical power source such as a fuel cell by operating it within a specific limited range of its overall operating envelope enables the energy conversion equipment to operate at peak efficiency. For an application where the power source is a fuel cell, the operably beneficial reduction in variance of the current draw is a function of the efficiency of the fuel cell. For example, a useful metric for the reduction in variance could be that the variance in current draw is limited to the range of current draws where the fuel cell operates at 85% efficiency where the choice of 85% is illustrative only and not intended to indicate that actual desirable operating regime for a fuel cell in as a power source in the above-described embodiments.

To the extent not already described, the different features and structures of the various embodiments can be used in combination with each other as desired. That one feature can not be illustrated in all of the embodiments is not meant to be construed that it can not be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for aircraft power distribution, comprising:
   a source of current to deliver an input power;
   a bus contactor connected to the source of current to receive the input power;
   a set of switches connected between the bus contactor and a set of essential and non-essential devices;
   a current analysis component to determine a power level drawn from the source of current by the set of essential and non-essential devices;
   a variation reduction component to determine an energization schedule of the set of essential and non-essential devices based on reducing temporal variation in the input power drawn from the source of current to the bus contactor, wherein the variation reduction component is configured to selectively energize a subset of the set of essential and non-essential devices to maintain a constant output power load; and
   a switch control component configured to adjust the set of switches according to the energization schedule.

2. The system of claim 1 further including a current sensing component that senses current through at least one of the bus contactor, the set of switches, or the source of current.

3. The system of claim 1 wherein the set of switches are a solid-state power controller.

4. The system of claim 1 wherein the non-essential loads includes variable loads.

5. The system of claim 4 wherein the variable loads include galley ovens or window de-icers.

6. The system of claim 1 wherein the switch control component adjusts the set of switches by pulse-width modulation (PWM).

7. The system of claim 1 wherein the source of current further includes one of a fuel cell or a generator.

8. The system of claim 1 further including one of a battery or capacitor connected to the source of current for storing excess electrical energy.

9. The system of claim 1 wherein the current analysis component determines the overall power demand of the set of essential and non-essential devices.

10. The system of claim 9 wherein the current analysis component compares the determined overall power demand of the set of essential and non-essential devices to a nominal full load rating of the source of current.

11. The system of claim 1 wherein the variation reduction component adjusts the power level to be drawn from the source of current so that the constant output power load is drawn from the source of current.

12. The system of claim 1 wherein the variation reduction component includes a control loop feedback mechanism that calculates an error value as a difference between a measured current flow and a desired setpoint and minimizes the error with a proportional-integral-derivative controller.

13. A method of distributing power in an aircraft, comprising:
   receiving a signal representing current flow from a source of current to a set of essential and non-essential devices;
   determining current draw by the set of essential and non-essential devices based on the signal;
   determining an energization schedule of the set of essential and non-essential devices;

selectively energizing a subset of the set of essential and non-essential devices to maintain a constant output power load; and adjusting a set of switches between a bus contactor and the set of essential and non-essential devices based on the energization schedule to reduce variation in the current draw from the source of current.

14. The method of claim 13 further comprising a step of sensing the current flow through the set of switches.

15. The method of claim 13 further comprising a step of sensing the current flow through the source of current.

16. The method of claim 13 further comprising a step of calculating an error value as a difference between a measured current flow and a desired setpoint and minimizing the error.

17. A power distribution controller for an aircraft, comprising:

a current analysis component to determine a power level drawn from a source of current by a set of essential and non-essential devices;

a variation reduction component to determine an energization schedule of the set of essential and non-essential devices to reduce variation in the input power drawn from the source of current to a bus contactor, wherein the variation reduction component is configured to selectively energize a subset of the set of essential and non-essential devices to maintain a constant output power load; and a switch control component configured to adjust a set of switches that couple the set of essential and non-essential devices to the source of current according to the energization schedule.

18. The controller of claim 17 further comprising a current sensing component that senses the current through at least one of the bus contactor, the set of switches, or the source of current.

19. The controller of claim 17 wherein the switch control component adjusts the set of switches by pulse-width modulation (PWM).

20. The controller of claim 17 wherein the variation reduction component includes a control loop feedback mechanism that calculates an error value as the difference between a measured current flow and a desired setpoint and minimizes the error with a proportional-integral-derivative controller.

* * * * *